(12) United States Patent
Hartmans

(10) Patent No.: US 10,094,218 B1
(45) Date of Patent: Oct. 9, 2018

(54) CONTINUOUS MOTION REVOLVING PISTON ENGINE

(71) Applicant: Gert-Willem Hartmans, Älmhult (SE)

(72) Inventor: Gert-Willem Hartmans, Älmhult (SE)

(73) Assignee: Gert-Willem Hartmans (SE)

( * ) Notice: Subject to any disclaimer, the term of this patent is extended or adjusted under 35 U.S.C. 154(b) by 0 days.

(21) Appl. No.: 15/911,121

(22) Filed: Mar. 4, 2018

Related U.S. Application Data

(63) Continuation of application No. 15/863,660, filed on Jan. 5, 2018, now abandoned.

(51) Int. Cl.
| | |
|---|---|
| *F01C 1/12* | (2006.01) |
| *F02B 53/12* | (2006.01) |
| *F02B 55/08* | (2006.01) |
| *F02B 53/06* | (2006.01) |
| *F02B 55/02* | (2006.01) |
| *F02B 37/00* | (2006.01) |
| *F02B 55/16* | (2006.01) |
| *F01C 21/00* | (2006.01) |
| *F04C 18/06* | (2006.01) |

(52) U.S. Cl.
CPC ............ *F01C 1/123* (2013.01); *F01C 21/008* (2013.01); *F02B 37/00* (2013.01); *F02B 53/06* (2013.01); *F02B 53/12* (2013.01); *F02B 55/02* (2013.01); *F02B 55/08* (2013.01); *F02B 55/16* (2013.01); *F04C 18/06* (2013.01)

(58) Field of Classification Search
CPC ........ F01C 1/063; F01C 1/123; F01C 21/008; F01C 1/16; F02B 53/00; F02B 53/02; F02B 53/06; F02B 53/12; F02B 55/02; F02B 55/08; F02B 55/16; F04C 18/06; Y02T 10/16

USPC .................. 123/232, 238; 418/191
See application file for complete search history.

(56) References Cited

U.S. PATENT DOCUMENTS

| 53,915 | A | | 4/1866 | Behrens | |
|---|---|---|---|---|---|
| 748,348 | A | | 12/1903 | Cooley | |
| 2,651,177 | A | * | 9/1953 | Pridham | ................ F02B 53/00 123/222 |
| 3,358,439 | A | * | 12/1967 | De Coye De Castelet | ................ F02B 37/00 123/213 |
| 5,518,382 | A | * | 5/1996 | Gennaro | ................... F01C 1/20 418/188 |
| 2009/0094988 | A1 | * | 4/2009 | Dunn | ..................... F02M 25/10 60/772 |
| 2012/0041665 | A1 | * | 2/2012 | Pursifull | .................. F01B 1/02 701/103 |

FOREIGN PATENT DOCUMENTS

CA      1176990      10/1984

* cited by examiner

*Primary Examiner* — Phutthiwat Wongwian
*Assistant Examiner* — Loren Edwards

(57) ABSTRACT

This invention of a continuous motion revolving piston engine describes a machine comprising piston(s) fitted to rings that revolve around a stator circular base which has a cavity in which a disc fits to create a closed combustion compartment together with the casing. The disc has a disc cavity to allow the piston to pass. The rotation of the disc and piston are synchronized to allow the piston to pass through the disc cavity. As there are no reciprocating parts and optionally enables an oil free operation, it is more efficient and has cleaner exhaust than existing engines.

5 Claims, 7 Drawing Sheets

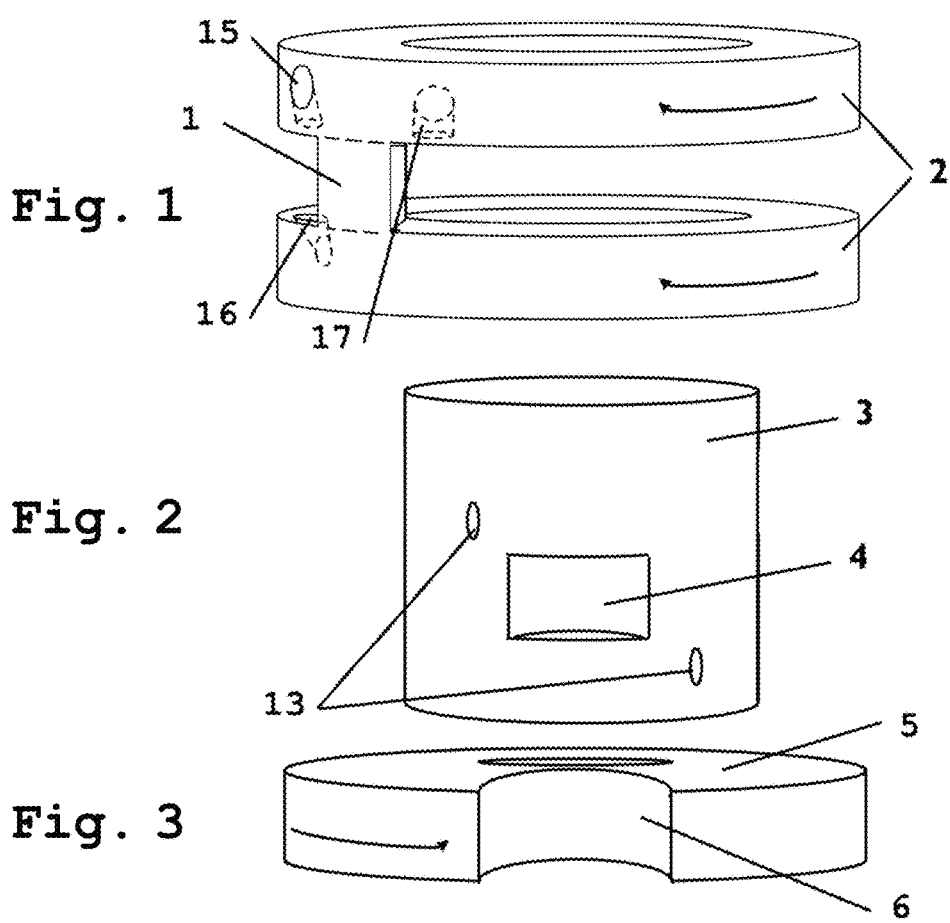

CONTINUOUS MOTION REVOLVING PISTON ENGINE

CROSS-REFERENCE TO RELATED APPLICATION

This application is a continuation of U.S. patent application Ser. No. 15/863,660, filed Jan. 5, 2018 which is not admitted to be prior art with respect to the present invention by its mention in the cross-reference section.

BACKGROUND OF THE INVENTION

Field of Invention

This invention relates to internal combustion engines, turbines and other engines that generate torque from a difference in pressure of gases or fluids.

Background

Many variations of internal combustion engines have been proposed. Those with reciprocating parts have the drawback that a large share of the energy is lost in moving the parts in opposite directions. Many designs without reciprocating parts have either increased complexity of number of moving parts and/or moving surfaces that make contact leading to loss of energy and/or wear of the parts involved. Designs with smaller contact surfaces and/or sealing to reduce drag, can have leakage reducing the performance.

BRIEF SUMMARY OF THE INVENTION

The primary objective is to overcome some of the shortcomings of the reciprocating and rotary combustion engines known today, allowing usage of different fuel types, a longer combustion period and optionally operated oil-free and/or with variable combustion timing.

The invention provides a non-reciprocating engine providing an expandable combustion compartment transferring pressure to torque with the compartment formed by a stator and casing, and revolving parts without making contact other than to guide rotation and with sufficient surface area of opposing moving parts to reduce leakage. Depending on materials used and precise manufacturing to minimize distance between moving parts creating a variable closed compartment that is used to drive the piston, it could avoid the need for sealing.

The invention provides intake, combustion, compression and exhaust in one revolution/cycle. Optionally combustion can be skipped one or more cycles to increase compression. Combustion can also take place in an external compartment. It allows for the usage of electronic timed valves for optimizing fuel burn under variable speed of rotation.

BRIEF DESCRIPTION OF THE DRAWINGS

FIG. 1) Perspective view of a single piston fitted to its supporting rings

FIG. 2) Perspective view of stator circular base with cavity in which part of a disc fits FIG. 3) Perspective view of disc with disc cavity to allow piston to pass through FIG. 4) Section view of piston fitted to its supporting rings, stator circular base with cavity and disc with disc cavity and output shaft all enclosed in a casing with casing in/outlets FIG. 5) Section view from same perspectives as FIG. 4 from above the gears FIG. 6) Cut-away view showing piston fitted to rings revolving around stator circular base, disc with output shaft, gears and casing FIG. 7) Exploded view of a four piston embodiment FIG. 8) A two piston embodiment with one centrally placed disc and output shaft FIG. 9) A three piston embodiment with one centrally placed disc and output shaft FIG. 10) A four piston embodiment with one centrally placed disc and output shaft FIG. 11) Ring channel aligned with casing inlet channel for air intake FIG. 12) Ring channel aligned with chamber channel for storage of compressed intake air in internal chamber FIG. 13) Chamber channel in stator circular base aligned with ring channel to lead compressed air from internal chamber storage to first closed compartment FIG. 14) Casing outlet channel as exhaust opening in casing positioned where piston passes through disc cavity to allow exhaust to escape

DETAILED DESCRIPTION OF THE INVENTION

Figure 4:
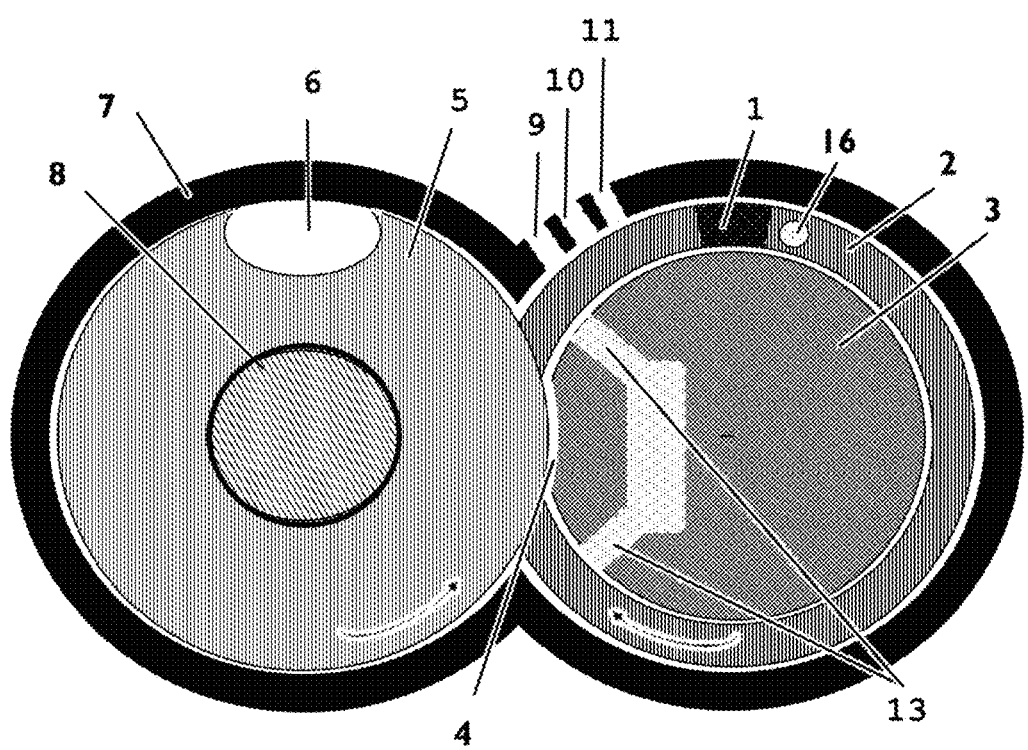

This invention describes a continuous motion revolving piston engine, a machine, which ensures a first closed compartment for combustion has considerable surface area between opposing moving parts to avoid the need for sealing and has no contact between moving parts other than to guide rotation. As it can operate oil free it can reduce problematic exhaust emissions as compared with current designs. Using a piston and a disc to close the first closed compartment during combustion, a so long burn cycle can reduce unwanted emissions, provide more efficient utilization of fuel and reduce noise.

Various objects, features, aspects, and advantages of the present invention will become more apparent from the following detailed description of preferred embodiments of the invention, along with the accompanying drawings in which like numerals represent like components.

Many variations of revolving piston or rotary engines exist, generally having small contact surfaces between moving parts leading to leakage mitigated by sealing that cause drag and wear of moving parts and loss of energy due reciprocating parts. This invention design has large opposing surfaces between moving parts to ensure a combustion compartment has low leakage and can transfer pressure differentiation to the piston and create torque reducing the need for sealing and can optionally operate oil-free.

The numbers in drawings refer to the following:
1 Piston
2 Rings supporting piston
3 Stator circular base (fixed to the casing)
4 Cavity in stator circular base 3
5 Disc
6 Disc cavity large enough to allow piston 1 to pass through
7 Casing
8 Output shaft
9 Casing inlet channel/valve for air intake
10 Combustible fuel intake channel/value in casing
11 Opening to apply ignition if required in casing
12 Casing outlet channel in casing, allowing exhaust to exit when piston 1 passes through disc cavity 6 in disc 5
13 Internal chamber for storage of compressed air and chamber channels/values 14 Gears connecting piston 1, rings 2 and disc 5 and/or output shaft 8

15 Ring channel/valve in ring 2, positioned to allow air intake when it passes channel 9 in casing 7

16 Ring channel/valve in ring 2 for compression of intake air into internal chamber 13

17 Ring channel/valve in ring 2 for allowing compressed air from internal chamber 13 to enter behind the piston 1

Main parts contributing to the engine are depicted in FIG. 1, FIG. 2 and FIG. 3. These are a piston 1, fitted between rings 2 that can revolve around a stator circular base 3 on suitable bearings (not shown). The stator circular base 3 has a cavity 4 formed to partly fit a disc 5 with the disc 5 axis of rotation being parallel to the axis of rotation of rings 2. The disc is connected to an output shaft 8 rotating on suitable bearings (not shown) and has a disc cavity 6 to allow the piston 1 to pass through when rings 2 and disc 5 rotate in opposite directions. Thus when rings 2 rotate clockwise, disc 5 rotates counterclockwise and vice versa. As displayed in FIG. 4, piston 1, rings 2, stator circular base 3 and disc 5, together with the casing 7 can form a first closed compartment behind the direction of the piston 1 and a second closed compartment in front of the direction of the piston 1, when the piston 1 is not passing through the disc cavity 6 in disc 5. Combustion in the first closed compartment will drive the piston 1 and create torque. Rotation of piston 1, rings 2 and the disc 5 are synchronized by gears 14 allowing the piston 1 to pass through the disc cavity 6 in the disc 5. The movement of the piston 1 can also be used for compression of intake air in the second closed compartment.

Using FIG. 4 as reference, the combustion, compression, exhaust and intake cycles would work in the following way:

Combustion: With piston 1, at around 12 o'clock and the disc cavity 6 in disc 5 also at 12 o'clock, a first closed compartment is formed left of the piston 1 in which combustion can take place driving the piston 1 clockwise.

Compression: While the piston 1 moves from around 12 o'clock to around 7 o'clock, with the disc 5 forming second closed compartment in front of the direction of piston 1 rotation allowing intake air to be compressed. This can be led to an internal chamber 13 to store, to be released later on to flow into the first closed compartment in which combustion can take place.

Figure 14:
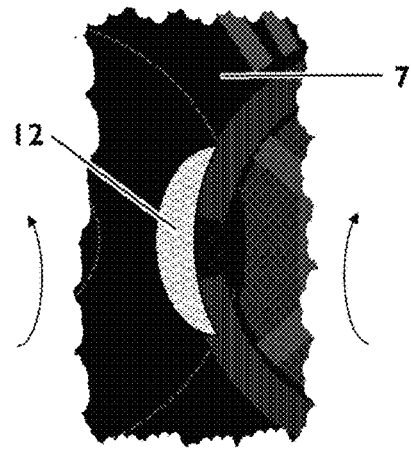

Exhaust: As the piston 1 passes through the disc cavity 6 in disc 5, gases can exit through casing outlet channel 12 in the casing 7 as the disc cavity 6 in disc 5 passes the casing outlet channel 12 (FIG. 14).

Intake: Intake of air would be driven through casing inlet channel 9 in the casing 7, from the start that exhaust takes place, up to the moment the disc cavity 6 in disc 5 reaches the top of cavity 4.

Figure 8:
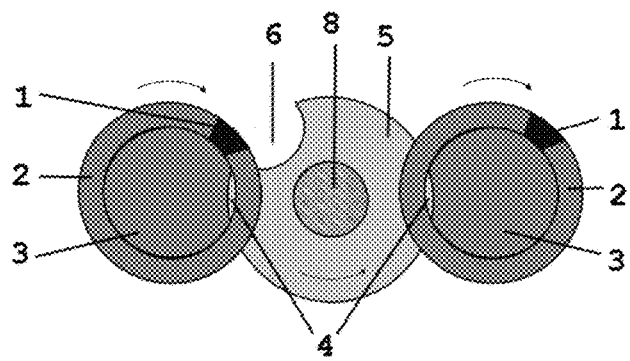
Figure 9:
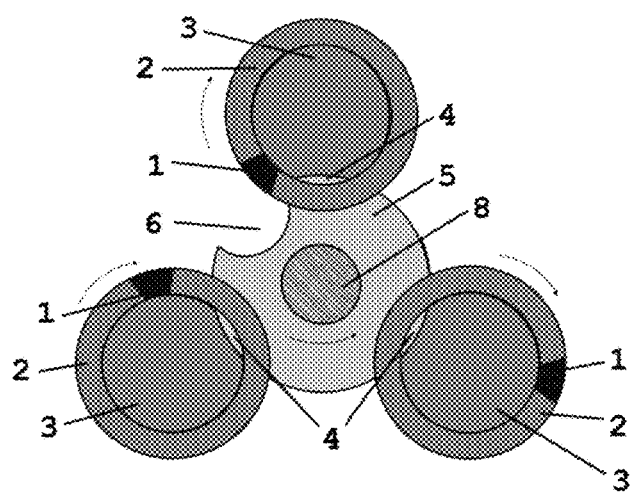
Figure 10:
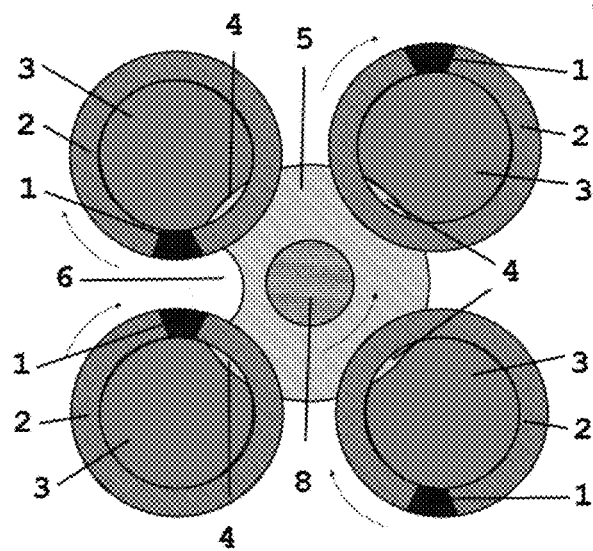

In the preferred embodiment of this invention multiple pistons would be included to allow continuous torque being generated allowing a smooth operation. This can be done with multiple pistons served by one disc 5 (FIGS. 8, 9 and 10).

As depicted in FIG. 4, close to where the combustion needs to takes place, casing inlet channel 9 for air intake, means of ignition 10 and/or fuel intake channel 11 would be placed. To ensure during combustion a first closed compartment is formed either any values are closed or positioning of ring channels in rotating rings 2, stator circular base 3 and casing 7 are designed to be closed.

Figure 5:
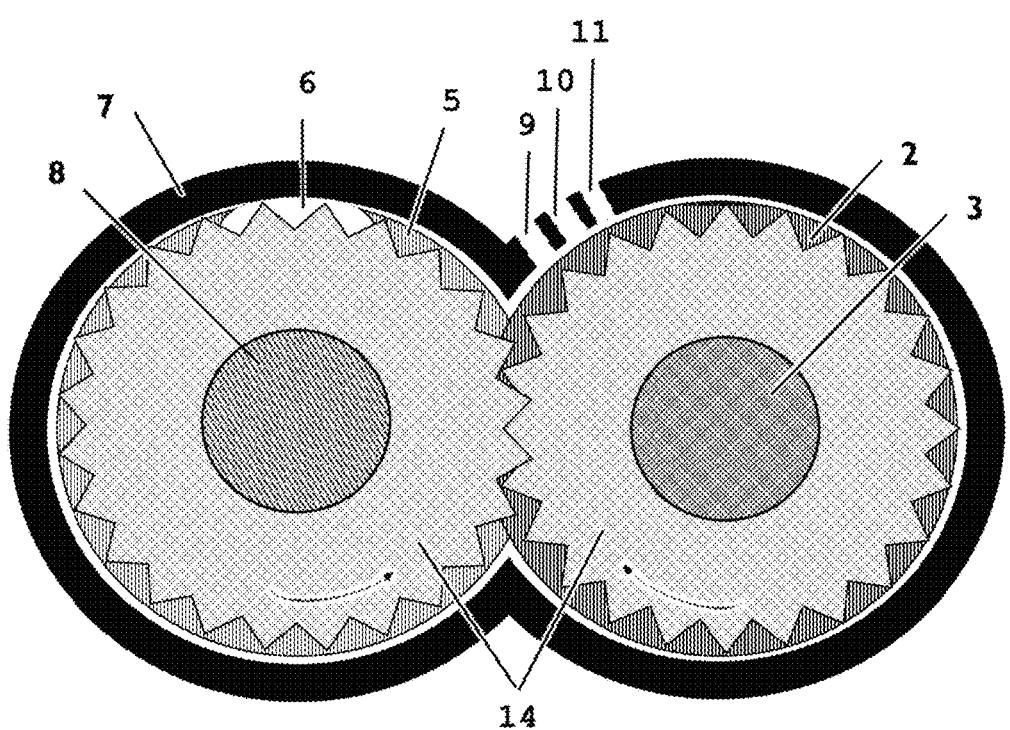

In the preferred embodiment, gears 14 as depicted in FIG. 5 would serve to synchronize rotation of piston 1 and rings 2, and disc 5, rotating in opposite directions to ensure the piston 1 passes through the disc cavity 6 in the disc 5. With the torque generated by the piston 1 being passed to the gears 14 attached to the rings 2, torque would be transferred by gears 14 attached to the output shaft 8 and/or disc 5.

Figure 6:
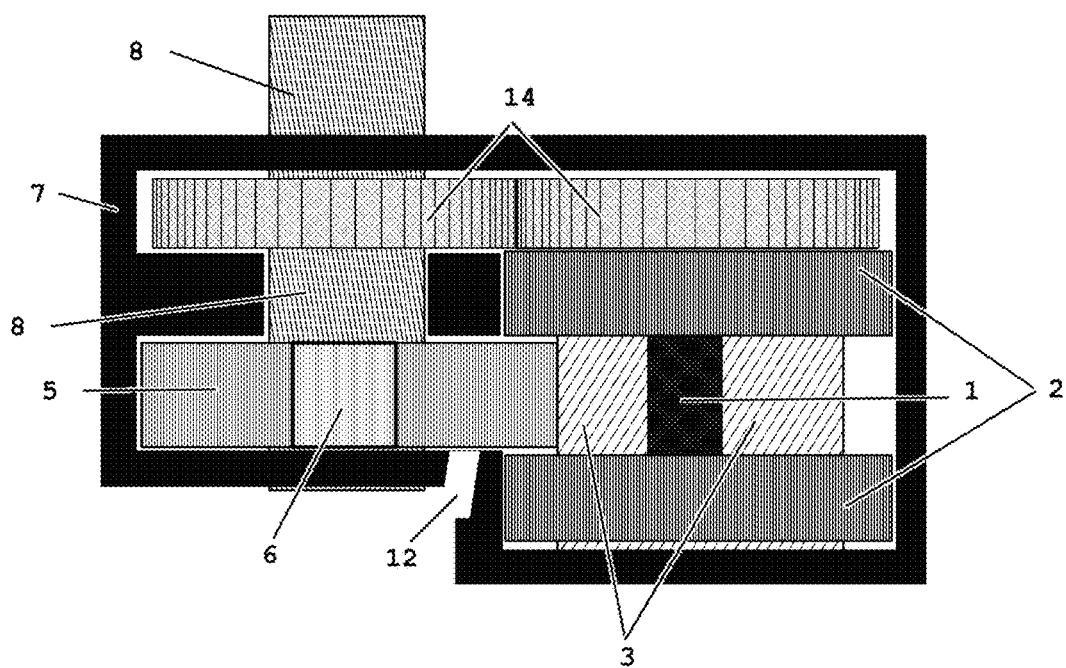
Figure 7:
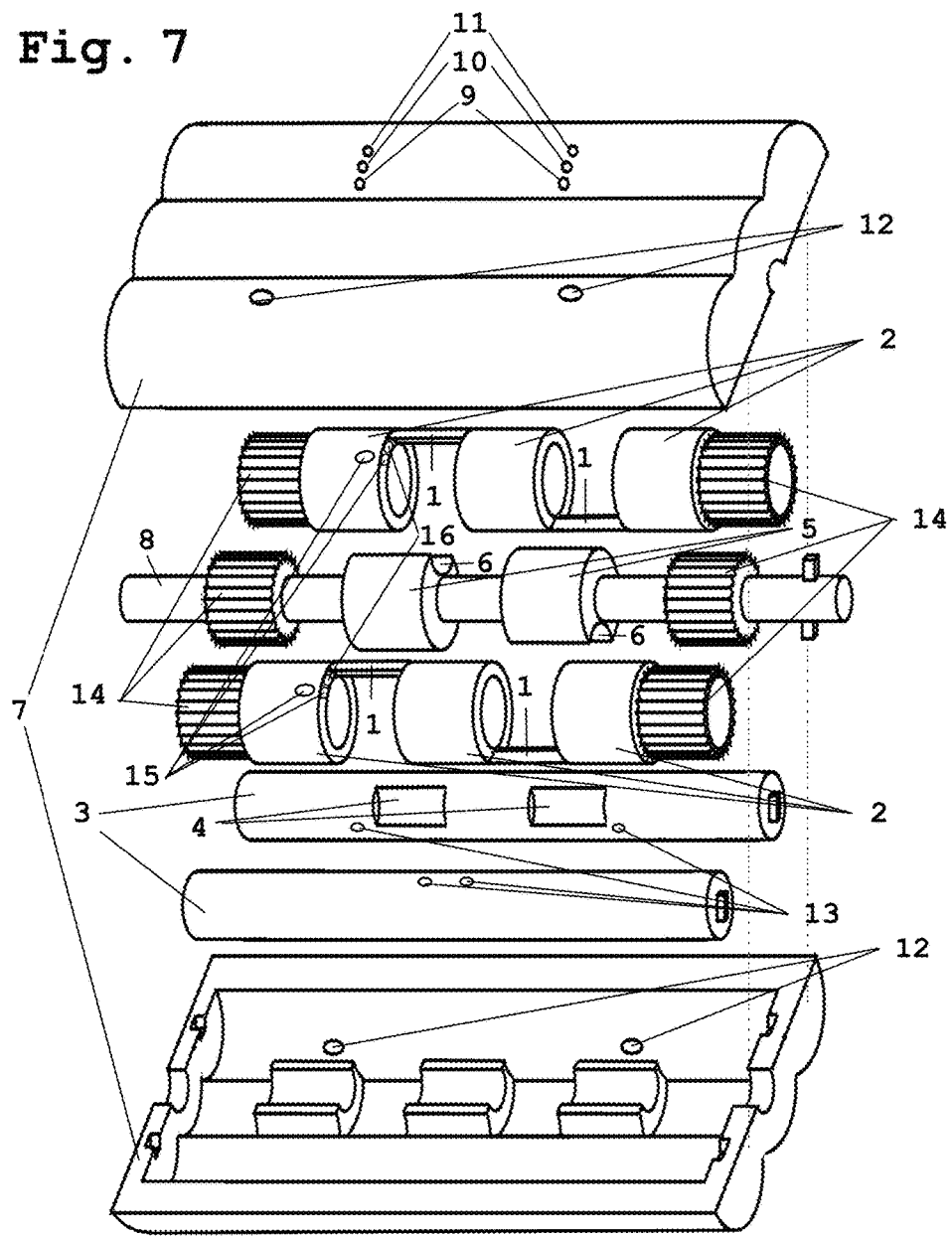

The output shaft 8 would extend outside the casing 7 to provide torque power for the intended usage of the engine (FIGS. 6 and 7). Gears 14 could also be placed outside the casing 7 when connected to the rings 2 and/or disc 5 through an opening in the casing 7.

Figure 11:
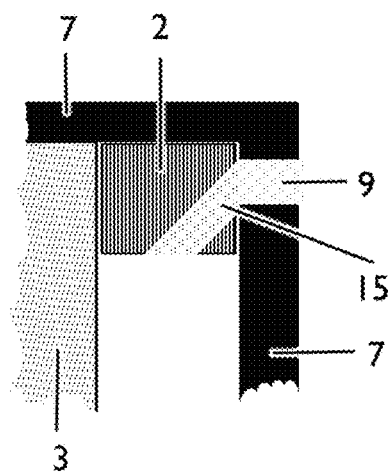
Figure 12:
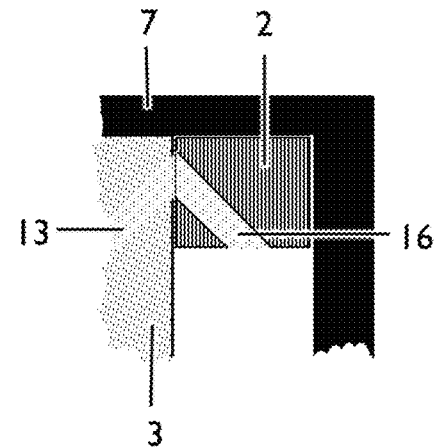
Figure 13:
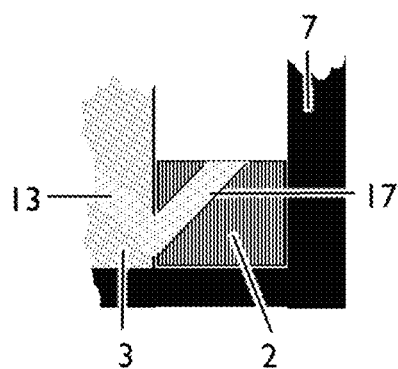

In the preferred embodiment, positioning of channels 15, 16 and 17 would be such that these serve as valves;

FIG. 11: Ring channel 15 serving as intake channel in ring 2, positioned to allow air intake when it passes channel 9 in casing 7, FIG. 12: Ring channel 16 in ring 2 positioned to allow compressed air in the second closed compartment in front of piston 1 movement to transfer to internal chamber 13, FIG. 13: Ring channel 17 in ring 2 positioned to allow compressed air transfer from internal chamber 13 to enter behind the piston 1.

Other types of mechanically or electronically controlled values could also be used to perform these functions.

Rings 2 could have material removed (hollow) on the side of the piston 1 or weight added on the opposite side to where the piston 1 is to have them evenly balanced. The rotating disc 5 could have material removed (hollow) in the opposite side of the disc cavity 6 in the disc 5 to be evenly balanced.

Materials used should be heat resistant and preferably have low expansion ratio when warming.

As the piston 1 turns with continuous motion, there is no energy lost to oscillation/reciprocating parts.

The piston 1, rings 2, stator circular base 3 with cavity 4, disc 5 and casing 7 can be shaped to have considerable opposing surfaces of moving parts with the aim of reducing leakage and avoiding the need for additional sealing. Without seals making contact with the casing 7 and stator circular base 3 there will be no wear and less energy loss as compared with designs requiring seals. Various ignition forms, fuel/air intake and outlets can be positioned to accommodate different fuels and air to fuel ratios, i.e. air intake and fuel mix. Depending on casing inlet/outlet positioning, the piston 1 can serve to compress air (with or without 'waste' cycles) and retain heat from previous combustion. A (exhaust driven) compression of intake air placed exterior to the casing could be added.

Depending on design of the piston 1 size and rotation length and casing inlet/outlet channels, longer burn cycles and low exhaust pressure (less noise etc.) can be zoo achieved by varying the duration of pressure differentiation driving the piston before exhaust starts and/or the mix of intake air and combustible fuel. As the pressure in the first closed compartment serving as combustion compartment is directly applied to rotation and no parts oscillate, energy can effectively be transformed to rotation. While it is apparent that the illustrative embodiments of the invention disclosed herein fulfill the objectives of the present invention, it is appreciated that numerous modifications and other embodiments may be devised by those skilled in the art. Additionally, feature(s) and/or elements(s) from any embodiment may be used singly or in combination with other embodiment(s). Therefore, it will be understood that the appended claims are intended to cover all such modifications and embodiments, which would come within the spirit and scope of the present inventions.

What is claimed is:

1. A machine comprising:
   one or more pistons supported by one or more rings that each revolve around a stator circular base, said stator circular base having a cavity in which part of a disc fits, said disc having an axis parallel to an axis of said one or more rings revolving around said stator circular base, said disc having a disc cavity in which said one or more pistons fit, said one or more pistons and said one or more rings, and said disc, rotating in opposite directions such that when said one or more pistons and said one or more rings rotate clockwise, said disc rotates counterclockwise or vice versa, the rotation of said one or more pistons and said one or more rings, and said disc, being synchronized to allow said one or more pistons to pass through said disc cavity, a casing enclosing said one or more pistons and said one or more rings, said disc and said stator circular base, said casing forms one or more closed compartments in which pressure differentiation drives said one or more pistons, gears attached to said one or more rings and said disc used to ensure synchronization of rotation, one or more output shafts, connected to said disc and/or said one or more rings and/or said gears, providing torque, said casing having one or more casing inlet channels and one or more casing outlet channels, an internal chamber and one or more chamber channels that connect to said internal chamber for storage of intake air, said one or more rings having one or more ring channels, that based on position of said one or more pistons align with said one or more casing inlet and/or said one or more casing outlet channels and/or said one or more chamber channels, to function as a valve.

2. The machine of claim 1 further comprising:
using combustion inside said one or more closed compartments to create said pressure differentiation to drive said one or more pistons,
using combustion outside said one or more closed compartments to create said pressure differentiation to drive said one or more pistons.

3. The machine of claim 1 further comprising:
positioning said internal chamber inside said stator circular base with said one or more chamber channels passing through said stator circular base,
positioning said one or more ring channels and said one or more chamber channels to store said intake air in said internal chamber,
positioning said one or more ring channels and said one or more chamber channels to release said intake air from said internal chamber.

4. The machine of claim 1 further comprising:
usage of said one or more casing inlet channels and said one or more casing outlet channels in said casing with rotation of said one or more rings to control a flows of said intake air and an exhaust between said one or more closed compartments and an exterior of said casing,
using the rotation of said one or more rings and an alignment of said one or more ring channels with said one or more chamber channels to control a second flow between said one or more closed compartments and said internal chamber for storage and release of said intake air.

5. The machine of claim 1 further comprising:
controlling different size and positioning of said one or more casing inlet channels, said one or more casing outlet channels, said one or more ring channels and/or said one or more chamber channels to vary duration of said pressure differentiation driving said one or more pistons and/or to vary a mix of said intake air and combustible fuel.

* * * * *